United States Patent
Atkinson et al.

(10) Patent No.: US 10,982,798 B2
(45) Date of Patent: Apr. 20, 2021

(54) PRESS-CONNECT FITTING WITH MEMBRANE SEAL

(71) Applicant: Mueller Industries, Inc., Memphis, TN (US)

(72) Inventors: John A. Atkinson, Nashville, TN (US); Jeston S. Cowen, Memphis, TN (US); Christopher A. Mueller, Collierville, TN (US)

(73) Assignee: Mueller Industries, Inc., Memphis, TN (US)

( * ) Notice: Subject to any disclaimer, the term of this patent is extended or adjusted under 35 U.S.C. 154(b) by 652 days.

(21) Appl. No.: 15/643,844

(22) Filed: Jul. 7, 2017

(65) Prior Publication Data
US 2019/0011065 A1 Jan. 10, 2019

(51) Int. Cl.
F16L 21/02 (2006.01)
F16L 13/14 (2006.01)
F16J 15/06 (2006.01)

(52) U.S. Cl.
CPC ............ *F16L 13/141* (2013.01); *F16J 15/06* (2013.01); *F16J 15/061* (2013.01); *F16L 13/142* (2013.01); *F16L 21/02* (2013.01)

(58) Field of Classification Search
CPC ........ F16L 13/141; F16L 13/142; F16L 21/02
See application file for complete search history.

(56) References Cited

U.S. PATENT DOCUMENTS

| | | | |
|---|---|---|---|
| 3,149,861 A * | 9/1964 | Larsson | F16L 13/142 285/349 |
| 9,638,360 B2 * | 5/2017 | Jamison | F16L 13/148 |
| 2002/1158466 | 10/2002 | Jones | |

FOREIGN PATENT DOCUMENTS

| | | | | |
|---|---|---|---|---|
| CA | 2674166 A1 | * | 2/2010 | ............ F16L 13/142 |
| CN | 104197126 A | | 12/2014 | |
| DE | 1182481 B | * | 11/1964 | ............ F16L 17/025 |
| DE | 2233102 A1 | * | 1/1974 | ............ F16L 13/142 |
| DE | 2938006 A1 | | 3/1981 | |
| DE | 19813805 C1 | | 7/1999 | |
| DE | 102005062738 A1 | * | 7/2007 | ............ F16L 13/142 |
| EP | 0503258 A2 | | 9/1992 | |
| EP | 2357389 A1 | | 8/2011 | |
| WO | WO 2016/029760 | * | 3/2016 | ............ F16L 13/142 |

OTHER PUBLICATIONS

European Search Report dated Mar. 12, 2018 for European Serial No. 18181744.6, dated Dec. 6, 2018.

* cited by examiner

*Primary Examiner* — Matthew Troutman
*Assistant Examiner* — James A Linford
(74) *Attorney, Agent, or Firm* — Harness, Dickey & Pierce, P.L.C.

(57) ABSTRACT

A connection joint for coupling a pair of conduits. The connection joint includes a tubular body having an inlet end and an outlet end that are each configured for receipt of a respective conduit therein. A first membrane seal is located within the tubular body and spaced apart from the inlet end, and a second membrane seal is located within the tubular body and spaced apart from the outlet end. The first and second membrane seals each have a bulbous portion located proximate the inlet end and outlet end, respectively, a tubular sleeve unitary with the bulbous portion located away from the inlet end and outlet end, respectively, and a plurality of radially inwardly extending ribs.

15 Claims, 6 Drawing Sheets

PRESS-CONNECT FITTING WITH MEMBRANE SEAL

FIELD

The present disclosure relates to a press-connect fitting.

BACKGROUND

This section provides background information related to the present disclosure which is not necessarily prior art.

Press copper fittings provide secure and reliable joints for conduit systems that may be used in a variety of different applications to transport liquids and/or gasses. One exemplary application is in the field of heating, ventilation, air conditioning, and refrigeration (HVAC/R). Conduit systems in HVAC/R applications are commonly installed in residential or commercial buildings, and are typically comprised of multiple conduits that carry a refrigerant. Traditionally, the multiple conduits of HVAC/R conduit systems were joined by brazed connections. When done properly, brazed connections have good durability and leak resistance. Brazing, however, is a time-consuming operation that requires special equipment and skills. In this regard, compared to soldering, brazing is a slower operation that requires higher temperatures. The high temperatures associated with brazing also require safety precautions in tight spaces and in occupied buildings.

More recently, crimp connections have been introduced in HVAC/R applications. Such crimp connections are gaining market acceptance because brazing is relatively time consuming as compared to the time required to install crimp connections. Due to this time savings, HVAC/R installation contractors have observed the ability for substantial savings in labor costs by utilizing crimp connections.

Notwithstanding these benefits, existing crimp connections are prone to leaks and separation, especially at high working pressures (e.g., pressures greater than 700 psi) and in applications using refrigerant gases where molecules of such gases are very small. Existing crimp connections typically include an inner O-ring seal that is carried on an inner diameter of the fitting body, wherein the O-ring seal engages the conduit upon insertion of the conduit into the fitting body. A crimping tool is subsequently employed to crimp the fitting body to thereby fix the fitting body and the conduit to one another. This type of crimp connection is prone to leaks because the outside surface of copper conduit is susceptible to imperfections (e.g. gouges, scratches, and incise marks) during its formation via extrusion. The outside surface of copper conduit, particularly at its free ends, is also susceptible to damage during shipping, storage, and handling. Such imperfections and damage may adversely affect the ability of the fitting body and the O-ring seal to seal against the outer surface of the conduit.

SUMMARY

This section provides a general summary of the disclosure, and is not a comprehensive disclosure of its full scope or all of its features.

The present disclosure provides a connection joint for a conduit, including a tubular body having an open end configured for receipt of the conduit therein. A membrane seal is located within the tubular body and spaced apart from the open end. The membrane seal has a primary seal feature located proximate the open end, and a secondary seal feature unitary with the primary seal feature located away from the open end. The membrane seal also includes a plurality of radially inwardly extending ribs, wherein the membrane seal is configured to sealingly engage an exterior surface of the conduit.

The present disclosure is also directed to a connection joint for coupling a pair of conduits. The connection joint includes a tubular body having an inlet end and an outlet end that are each configured for receipt of a respective conduit therein. A first membrane seal is located within the tubular body and spaced apart from the inlet end, and a second membrane seal is located within the tubular body and spaced apart from the outlet end. The first and second membrane seals each have a bulbous portion located proximate the inlet end and outlet end, respectively, a tubular sleeve unitary with the bulbous portion located away from the inlet end and outlet end, respectively, and a plurality of radially inwardly extending ribs.

The present disclosure is also directed to a method of connecting a pair of conduits. The method includes providing a connection fitting including a tubular body having an inlet end and an outlet end. A first membrane seal is located within the tubular body and spaced apart from the inlet end, and a second membrane seal is located within the tubular body and spaced apart from the outlet end. The conduits are inserted into the inlet end and outlet end, respectively, of the connection fitting such that exterior surfaces of the conduits are engaged by the first and second membrane seals, respectively, and then the tubular body is crimped to the conduits on opposing sides of each of the first and second membrane seals. The first and second membrane seals each having a bulbous portion located proximate the inlet end and outlet end, respectively, and the first and second membrane seals each having a tubular sleeve unitary with the bulbous portion located away from the inlet end and outlet end, respectively, and each of the first and second membrane seals having a plurality of radially inwardly extending ribs.

The present disclosure is also directed to a connection joint for a conduit, comprising a tubular body having an open end configured for receipt of the conduit therein. A membrane seal is located within the tubular body and spaced apart from the open end. The membrane seal has a primary seal feature located proximate the open end and a secondary seal feature located away from the open end, and an annular lip that extends radially inwardly from a terminal end of the secondary seal feature, wherein the membrane seal is configured to sealingly engage an exterior surface of the conduit, and the annular lip is configured to abut an end of the conduit.

The present disclosure also provides a connection joint for a conduit, comprising a tubular body having an open end configured for receipt of the conduit therein. A membrane seal is located within the tubular body and spaced apart from the open end. The membrane seal has a primary seal feature located proximate the open end and a secondary seal feature located away from the open end, and a plurality of radially outwardly extending rails, wherein the membrane seal is configured to sealingly engage an exterior surface of the conduit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
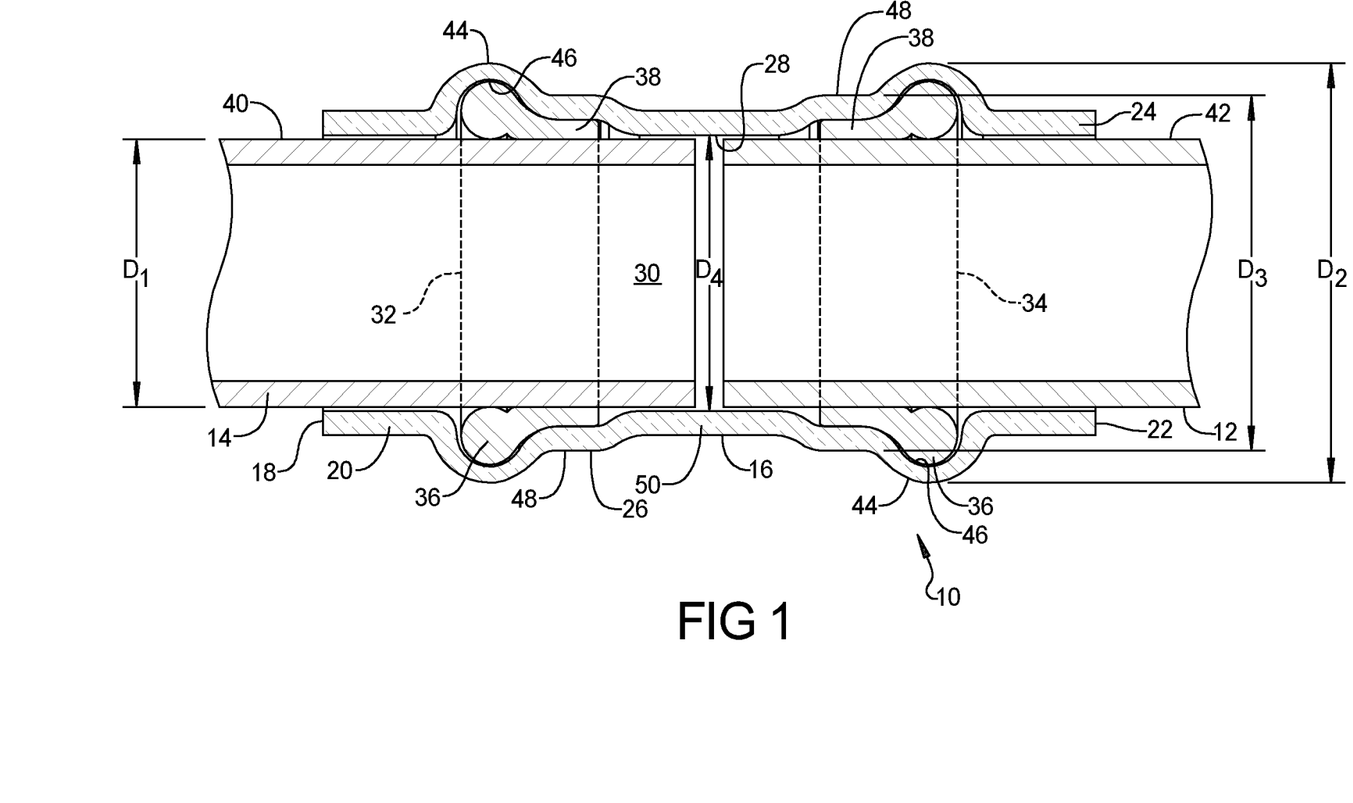
FIG. 1 is a cross-sectional view of a fitting configured to interconnect a pair of conduits according to a principle of the present disclosure.

FIG. 1 illustrates a connection joint or fitting 10 for connecting a pair of conduits 12 and 14 according to a principle of the present disclosure. It should be understood that, in FIG. 1, the conduits 12 and 14 are illustrated as being inserted into fitting 10 in an un-crimped state. Crimping of fitting 10 to ensure a leak-proof seal between fitting 10 and conduits 12 and 14 will be described in more detail later.

Fitting 10 and conduits 12 and 14 are preferably formed of a metal material such as copper. It should be understood, however, that other metal materials such as aluminum and the like are contemplated. Fitting 10 includes a tubular body 16 having a first end 18 defining an inlet 20, an opposite second end 22 defining an outlet 24, an exterior surface 26, an interior surface 28, and a hollow interior 30 between inlet 20 and outlet 24. In the illustrated configuration, inlet 20 and outlet 24 each have a first diameter D1. It should be understood, however, that inlet 20 and outlet 24 are not required to have the same diameter. In this regard, inlet 20 may have a larger diameter than outlet 24, or vice versa. Although not illustrated, it should be understood that fitting 10 can include an inlet 20 and a pair of outlets 24. In other words, fitting 10 can have a T-shape such that three conduits can be connected via a single fitting 10.

Fitting 10 includes a first or inlet-side membrane seal 32 and a second or outlet-side membrane seal 34. As best shown in FIGS. 2-7, membrane seals 32 and 34 each include a bulbous portion 36 and a tubular sleeve portion 38. In the illustrated configuration, bulbous or O-ring portion 36 and tubular sleeve portion 38 are unitary. Membrane seals 32 and 34 are configured to sealingly engage with exterior surfaces 40 and 42 of conduits 12 and 14 that are mated with inlet 20 and outlet 24, respectively. Bulbous portions 36 are located nearer to inlet 20 and outlet 24, respectively, in comparison to tubular sleeve portions 38. In this regard, bulbous portions 36 are configured to provide a first or primary sealing function while tubular sleeve portions 38 are configured to provide a secondary sealing function. A length of tubular sleeve portion 38 is variable, but the length is preferably selected such that when fitting 10 and conduits 12 and 14 are crimped together, there is conduit-to-fitting contact on opposing sides of membrane seals 32 and 34, as will be described later.

Tubular body 16 includes a pair of radially outwardly extending ridges 44 that are configured to provide a seating surface 46 for receipt of bulbous portions 36. Radially outwardly extending ridges provide tubular body 16 with a second diameter D2 that is greater than the diameter D1 of inlet 20 and outlet 24. Tubular body 16 also includes a pair of radially expanded sections 48 that provide tubular body with a third diameter D3 that is greater than the diameter D1 of the inlet 20 and outlet 24, but less than the second diameter D2 of ridges 44. Radially expanded sections 48 extend axially along at least a portion of tubular body 16 from ridges 44 in a direction away from either inlet 20 or outlet 24. For example, the radially expanded section 48 that is configured for receipt of sleeve portion 38 of inlet-side membrane seal 32 extends from ridge 44 in a direction toward outlet 24, and the radially expanded section 48 that is configured for receipt of sleeve portion 38 of outlet-side membrane seal 34 extends from ridge 44 in a direction toward inlet 20. A central section 50 of tubular body 16 located between membrane seals 32 and 34 has a diameter D4 that is equal to the diameter D1 of inlet 20 and outlet 24. It should be understood that the diameters D1-D4, length of fitting 10, and other dimensions are variable, and can be selected based on the desired application for fitting 10. Central section 50 may include a radially inwardly extending nub 51 (see, e.g., FIG. 8) that can serve as a stop or abutment surface for conduits 12 and 14 when each are inserted into fitting 10. Such a feature, however, is not necessarily required.

Figure 2:
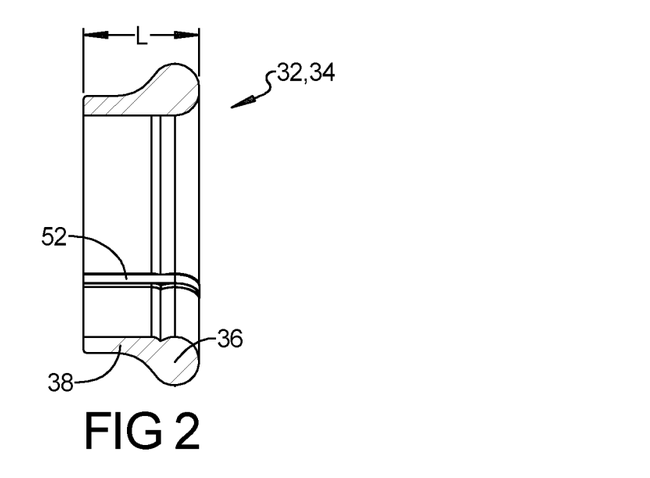
FIG. 2 is a cross-sectional view of a membrane seal according to a principle of the present disclosure.
Figure 3:
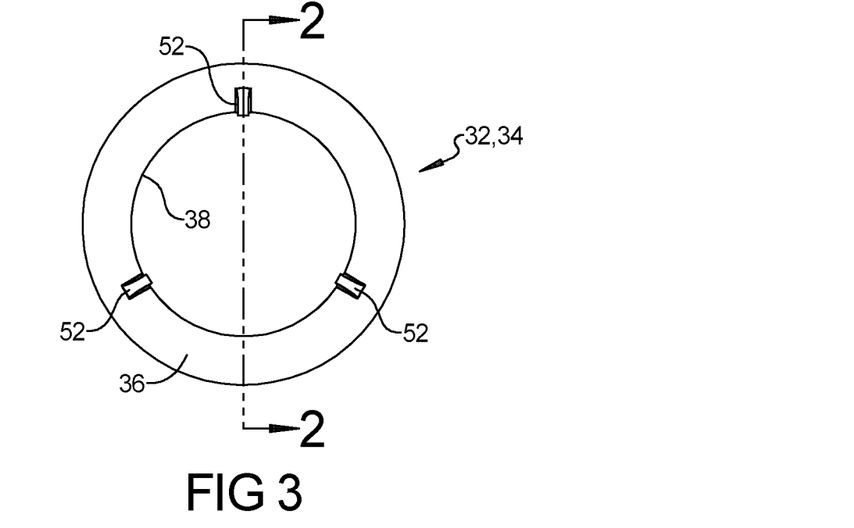
FIG. 3 is a perspective view of an inlet of the membrane seal illustrated in FIG. 2.
Figure 4:
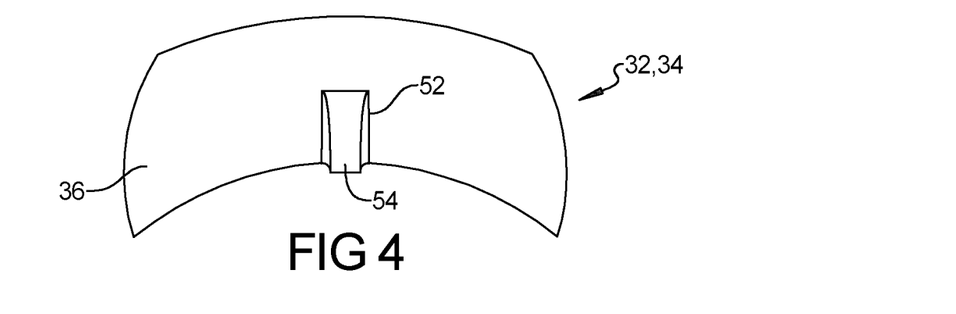
FIG. 4 is an enlarged perspective view of a guide rib of the membrane seal illustrated in FIGS. 2 and 3.
Figure 5:
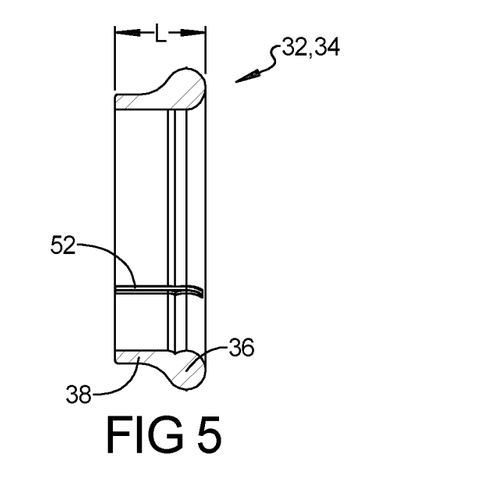
FIG. 5 is a cross-sectional view of another membrane seal according to a principle of the present disclosure.
Figure 6:
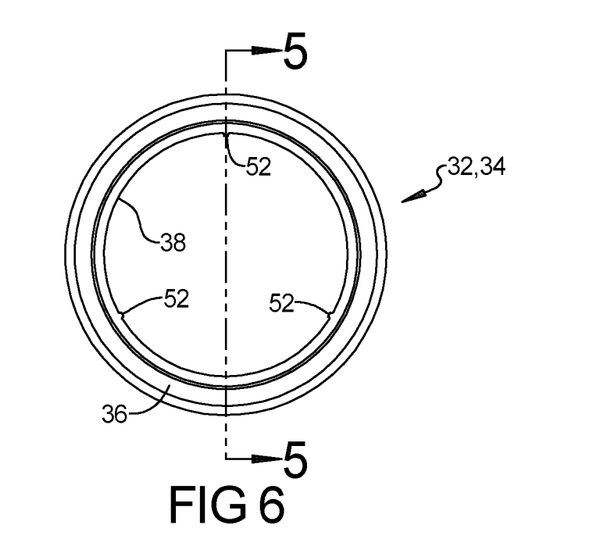
FIG. 6 is a perspective view of an inlet of the membrane seal illustrated in FIG. 5.
Figure 7:
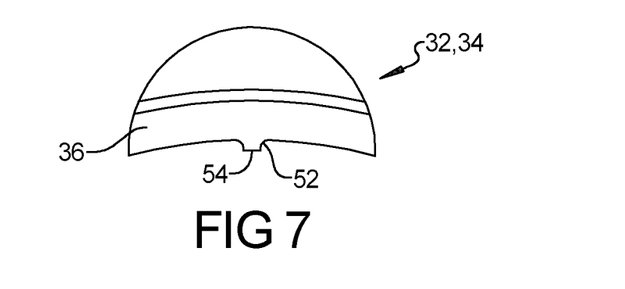
FIG. 7 is an enlarged perspective view of a guide rib of the membrane seal illustrated in FIGS. 5 and 6.

As best shown in FIGS. 2-7, each membrane seal 32 and 34 includes a plurality of radially inwardly extending guide ribs 52. Guide ribs are configured to reduce the amount of friction experienced between conduits 12 and 14 and membrane seals 32 and 34 during insertion of conduits 12 and 14 into fitting 10. As best shown in FIGS. 4 and 7, guide ribs 52 include a contact surface 54 that engages outer surfaces 40, 42 of conduits 12 and 14. In the illustrated configurations, contact surface 54 is flat, which allows guide ribs 42 to act as rails during insertion of conduits 12 and 14 into fitting 10. It should be understood, however, that contact surface may be curved (e.g., circular- or oval-shaped) or pointed (e.g., triangular-shaped), without departing from the scope of the present disclosure.

As best shown in FIGS. 2-4, guide ribs 52 can extend axially along substantially an entire length L of membrane seals 32 and 34, or as best shown in FIGS. 5-7 can extend axially a distance that is less than the entire length of membrane seals 32 and 34. Further, it should be understood that although only three guide ribs 52 are illustrated in FIGS. 3 and 6, any number of guide ribs 52 can be used so long as friction is reduced when inserting conduits 12 and 14 into fitting 10, and so long as guide ribs 52 can be used to center conduits 12 and 14 relative to membrane seals 32 and 34 to assist in preventing damage to membrane seals 32 and 34 during insertion of conduits 12 and 14 into fitting 10. In general, the number of guide ribs 52 can be selected based on the specific application for fitting 10, or selected on the size of the membrane seals 32 and 34. For example, a 0.5 inch diameter membrane seal may use three guide ribs 52, while a larger diameter membrane seal (e.g., 0.75 inch or 1 inch) can include four, five, six or more guide ribs 52.

In addition to reducing friction between conduits 12 and 14 and membrane seals 32 and 34 during insertion of conduits 12 and 14 into fitting 10, guide ribs 52 can be used for detecting leaks between conduits 12 and 14 and fitting 10. That is, to ensure a proper seal between conduits 12 and 14 and fitting 10, the fitting 10 and conduits 12 and 14 are crimped after insertion of conduits 12 and 14 into fitting 10. If this step is accidentally omitted, the omission can be realized when conducting a leak detection test where compressed air or some other type of fluid can be passed through conduits 12 and 14 and fitting 10 because ribs 52 will allow the compressed air or fluid to pass between membrane seals 32 and 34 and conduits 12 and 14, which yields a pressure drop that indicates unsatisfactory sealing between conduits 12 and 14 and fitting 10. If such a pressure drop occurs, the operator can crimp or re-crimp the fitting 10 and conduits 12 and 14 to ensure proper sealing.

In another variation, during insertion of conduits 12 and 14 into membrane seals 32 and 34, respectively, guide ribs 52 can be configured compress to an extent that a seal is developed between bulbous portions 36, sleeve portions 38, and outer surfaces 40 and 42 of conduits 12 and 14. To preliminarily test this seal, compressed air or some other type of fluid can be passed through conduits 12 and 14 and fitting 10. If a sufficient pressure drop occurs, this may indicate that membrane seals 32 and 34 or conduits 12 and 14 are damaged to an extent that even after fitting 10 is crimped, a satisfactory seal between fitting 10 and conduits 12 and 14 cannot be achieved.

Figure 8:
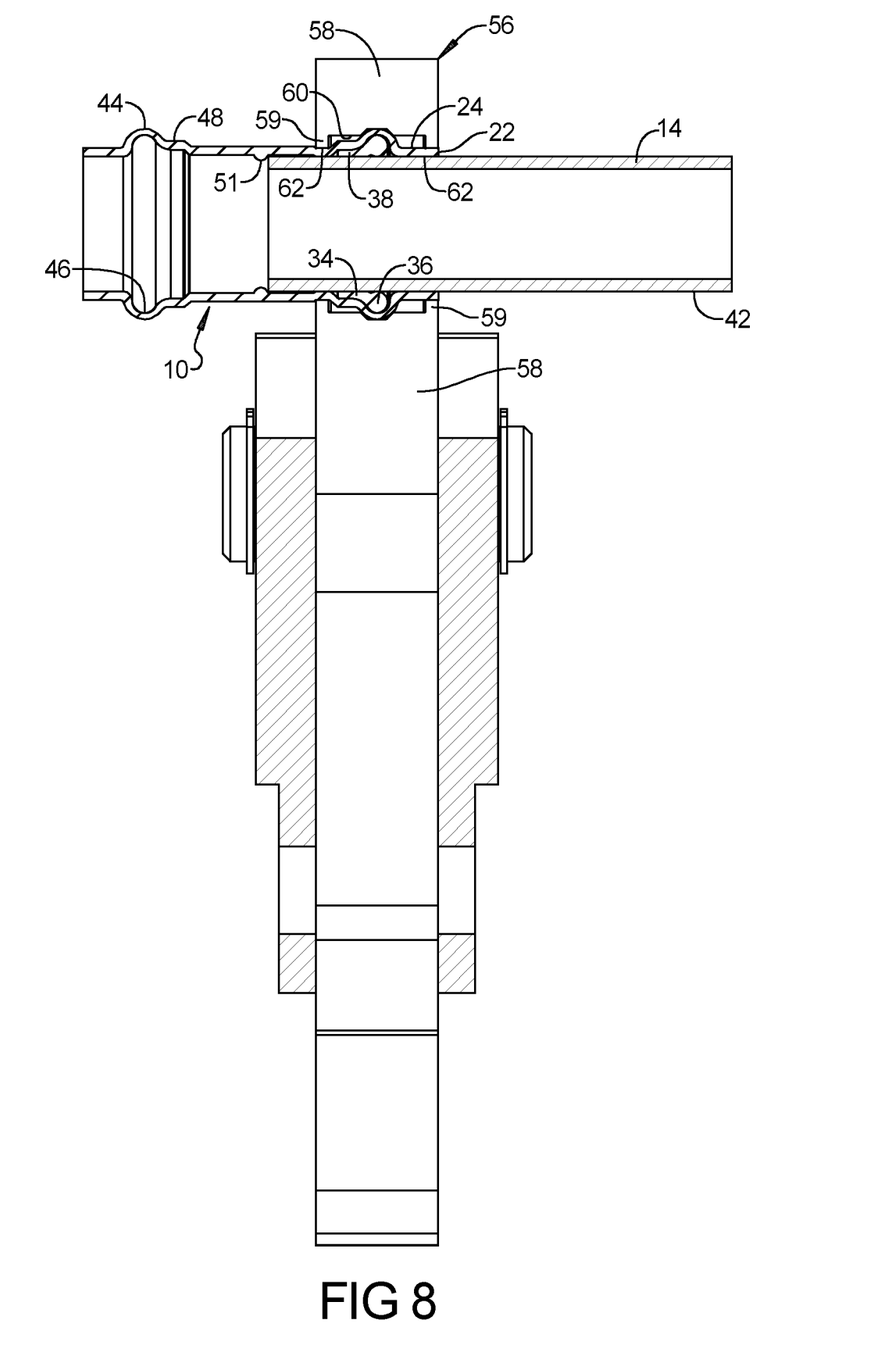
FIG. 8 is a cross-sectional view of a fitting according to the present disclosure being crimped by a crimping tool.

Now referring to FIG. 8, the process of crimping the fitting 10 to ensure a satisfactory seal between fitting 10 and conduits 12 and 14 will be described. As shown in FIG. 8, conduit 14 has been inserted into fitting 10 until it abuts radially inwardly extending nub 51, and a crimping tool 56 including crimping dies 58 has been placed about fitting 10. Dies 58 have feet 59 that are configured to contact tubular body 16 of fitting 10 and crimp fitting 10 to conduit 14. Feet 59 define a cavity 60 therebetween for accommodating ridges 44. That is, feet 59 are spaced apart to an extent such that ridge 44 and radially expanded section 48 fit between feet 58. With this configuration, crimping of fitting 10 and conduit 14 ensures a metal-to-metal contact on opposing sides of membrane seal 34 such that membrane seal 34 is sandwiched between the crimps 62 between fitting 10 and conduit 14, which increases the robustness of the seal between fitting 10 and conduit 14. In this regard, fitting 10 can be used in high-pressure (e.g., greater than 700 psi) applications that were previously not desirable for crimp fittings. Once tool 56 is properly placed about fitting 10, the operator actuates the tool 56 to form the crimps 62 and secure conduit 14 to fitting 10. Tool 56 may then be removed from fitting 10, conduit 12 may be inserted into the opposing end of fitting 10, and the process repeated.

Figure 9:
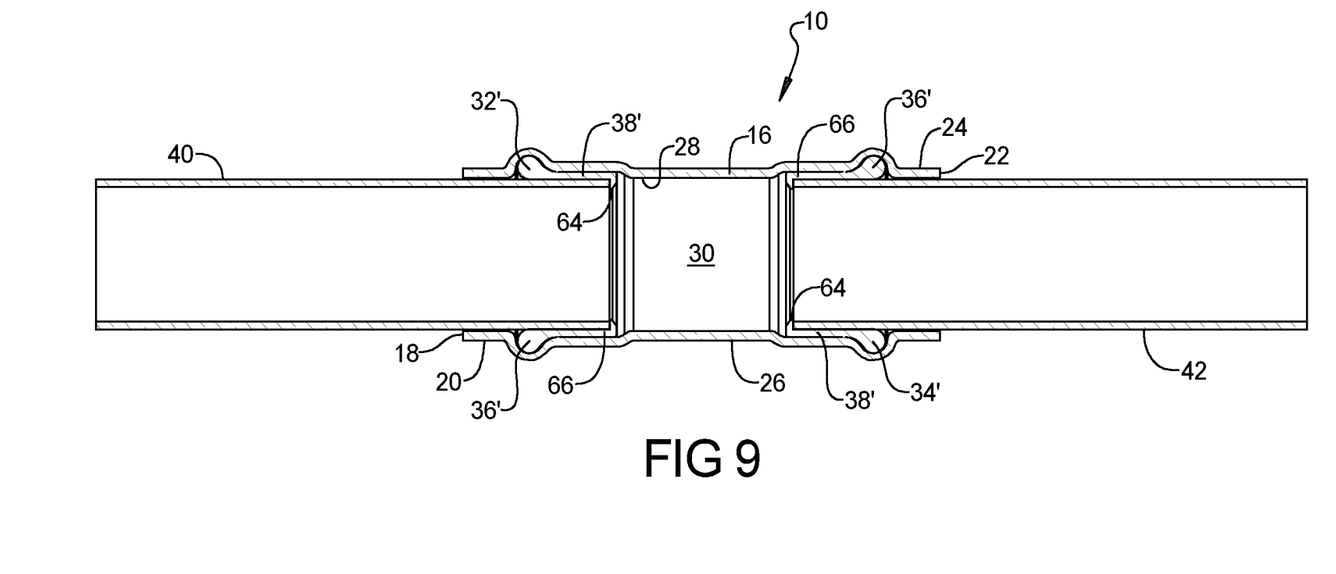
FIG. 9 is a cross-sectional view of another fitting configured to interconnect a pair of conduits according to a principle of the present disclosure.

Now referring to FIG. 9, a fitting 10 that is configured for a low-pressure application is illustrated. Fitting 10 is similar to that illustrated in FIG. 1. In this regard, fitting 10 in FIG. 9 has a tubular body 16 having a first end 18 defining an inlet 20, an opposite second end 22 defining an outlet 24, an exterior surface 26, an interior surface 28, and a hollow interior 30 between inlet 20 and outlet 24. Fitting 10 also includes a first or inlet-side membrane seal 32' and a second or outlet-side membrane seal 34' that each include a bulbous portion 36' and a tubular sleeve portion 38' that are unitary. Membrane seals 32' and 34' are configured to sealingly engage with exterior surfaces 40 and 42 of conduits 12 and 14 that are mated with inlet 20 and outlet 24, respectively. Although not necessarily required, each membrane seal 32' and 34' may include a plurality of radially inwardly extending guide ribs 52 (not shown in FIG. 9) that are configured to reduce the amount of friction experienced between conduits 12 and 14 and membrane seals 32' and 34' during insertion of conduits 12 and 14 into fitting 10.

The primary difference between membrane seals 32' and 34' and the membrane seals 32 and 34 illustrated 1-7 is that membrane seals 32' and 34' include an annular lip 64 that extends radially inwardly from a terminal end 66 of tubular sleeve portion 38'. When membrane seals 32' and 34' include the annular lip 64, membrane seals 32' and 34' have a shape, in cross-section, of a music note (♪). Annular lip 64 is configured to act as an abutment surface for conduits 12 and 14 when conduits 12 and 14 are inserted into fitting 10. In this regard, the distance at which annular lip 64 extends radially inward from sleeve portion 38' is about equal to or slightly greater than a thickness of conduits 12 and 14. Because conduits 12 and 14 cannot be inserted past membrane seals 32' and 34', however, there can be no metal-to-metal contact between conduits 12 and 14 and fitting 10 on opposing sides of membrane seals 32' and 34' after crimping fitting 10 to conduits 12 and 14. Notwithstanding, the sealing engagement between membrane seals 32' and 34' and conduits 12 and 14 provides a satisfactory seal in low-pressure applications (e.g., less than 700 psi).

Figures 10, 11:
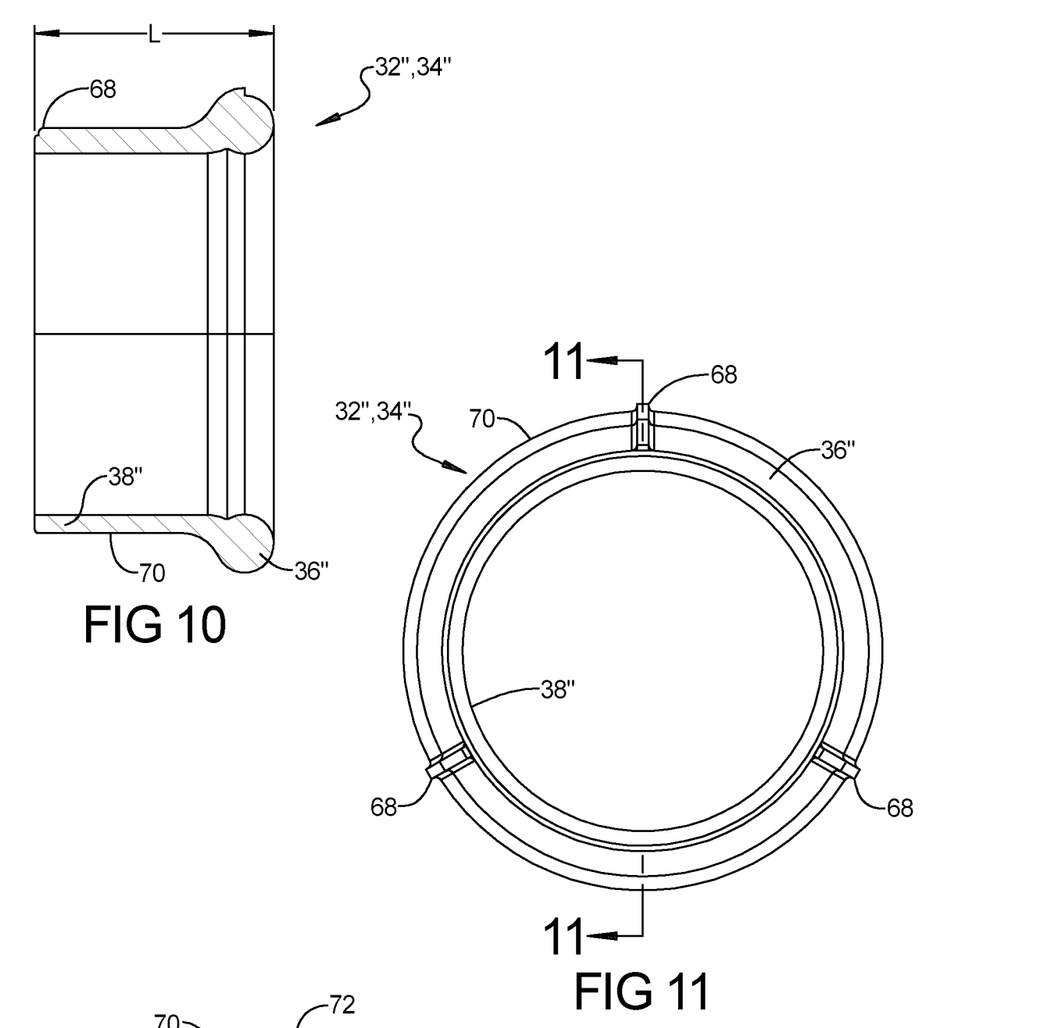
FIG. 10 is a cross-sectional view of another membrane seal according to a principle of the present disclosure.
FIG. 11 is a perspective view of an inlet of the membrane seal illustrated in FIG. 10.
Figure 12:
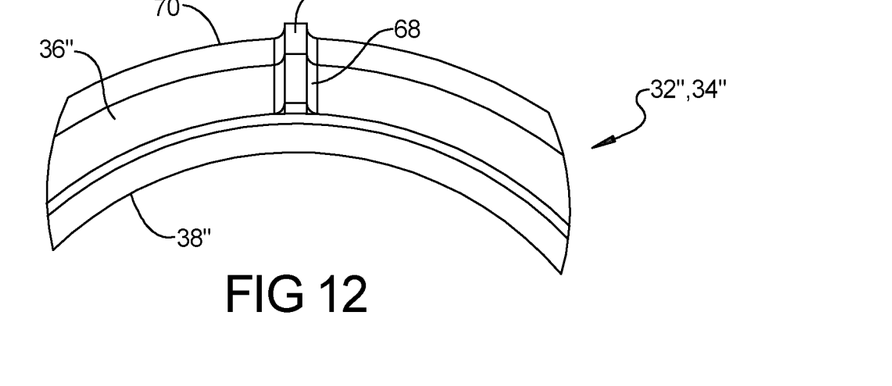
FIG. 12 is an enlarged perspective view of a rail of the membrane seal illustrated in FIGS. 10 and 11.

Now referring to FIGS. 10-12, another membrane seal 32", 34" according to the present disclosure is illustrated. Membrane seal 32", 34" includes a bulbous portion 36" and a tubular sleeve portion 38" that are unitary, and that sealingly engage with exterior surfaces of conduits 12 and 14 when conduits 12 and 14 are mated with inlet 20 and outlet 24, respectively, of fitting 10.

The primary difference between membrane seal 32", 34" and the membrane seals 32, 34, 32', and 34' illustrated in FIGS. 2-7 is that membrane seal 32", 34" includes a plurality of radially outwardly extending rails 68 that are formed on an exterior 70 of membrane seal 32", 34". Rails 68 are designed to engage with interior surface 28 (FIG. 1) of fitting 10. Although only three rails 68 are illustrated, it should be understood that any number of rails 68 can be used. Rails 68 can extend axially along substantially an entire length L of membrane seal 32", 34", or as best shown in FIG. 10 can extend axially a distance that is less than the entire length L of membrane seal 32", 34".

In addition to reducing friction between inlet 20 and outlet 24 and membrane seals 32" and 34" during insertion of membrane seals 32" and 34" into fitting 10, rails 68 can be used for detecting leaks when conduits 12 and 14 are inserted into fitting 10 including membrane seals 32" and 34". As noted above, to ensure a proper seal between conduits 12 and 14 and fitting 10, the fitting 10 and conduits 12 and 14 are crimped after insertion of conduits 12 and 14 into fitting 10. If this step is accidentally omitted, the omission can be realized when conducting a leak detection test where compressed air or some other type of fluid can be passed through conduits 12 and 14 and fitting 10 because rails 68 will allow the compressed air or fluid to pass between membrane seals 32 and 34 and fitting 10, which yields a pressure drop that indicates unsatisfactory sealing between conduits 12 and 14 and fitting 10. If such a pressure drop occurs, the operator can crimp or re-crimp the fitting 10 and conduits 12 and 14 to ensure proper sealing.

During insertion of conduits 12 and 14 into membrane seals 32" and 34", respectively, rails 68 can also be configured compress to an extent that a seal is developed between bulbous portions 36", sleeve portions 38", and inner surface 28 of fitting 10. To preliminarily test this seal, compressed air or some other type of fluid can be passed through conduits 12 and 14 and fitting 10. If a sufficient pressure drop occurs, this may indicate that membrane seals 32" and 34" or conduits 12 and 14 are damaged to an extent that even after fitting 10 is crimped, a satisfactory seal between fitting 10 and conduits 12 and 14 cannot be achieved.

As best shown in FIGS. 11 and 12, rails 68 include a contact surface 72 that engages inner surface 28 of fitting 10. In the illustrated configurations, contact surface 72 is flat. It should be understood, however, that contact surface 72 may be curved (e.g., circular- or oval-shaped) or pointed (e.g., triangular-shaped), without departing from the scope of the present disclosure.

During crimping of fitting 10, membrane seals 32, 32', 32", 34, 34', and 34" are compressed. To ensure proper compression of membrane seals 32, 32', 32", 34, 34', and 34", membrane seals 32, 32', 32", 34, 34', and 34" may be formed of a material having a Shore A hardness that is in the range of 55 to 65. Example materials having such hardness include ethylene propylene diene monomer (EPDM), and hydrogenated nitrile butadiene rubber (HNBR). When membrane seals 32, 32', 32", 34, 34', and 34" are formed of a material having a Shore A hardness in the above-noted range, the material is able to compress to an extent that imperfections (e.g. gouges, scratches, and incise marks) formed on conduits 12 and 14 during their formation via extrusion or before mating with fitting 10 can be satisfactorily sealed by membrane seals 32, 32', 32", 34, 34', and 34". It should be understood, however, that the type of material selected for membrane seals 32, 32', 32", 34, 34', and 34" can be based on the desired application for fitting 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A connection joint for a conduit, comprising:
    a tubular body having an open end configured for receipt of the conduit therein; and
    a membrane seal body located within the tubular body and spaced apart from the open end, the membrane seal body having a first terminal end and an opposite second terminal end, the first terminal end defined by a primary seal feature and the opposite second terminal end defined by a secondary seal feature, the first terminal end of the membrane seal body being located proximate the open end and the second terminal end being located away from the open end, and a plurality of radially inwardly extending ribs that extend axially along each of the primary seal feature and the secondary seal feature, the radially inwardly extending ribs extending axially along an entire length of the secondary seal feature to the second terminal end of the membrane seal body,
    wherein the membrane seal body is configured to sealingly engage an exterior surface of the conduit, and wherein the primary seal feature is a bulbous portion of the membrane seal body and the secondary seal feature is a tubular sleeve of the membrane seal body.

2. The connection joint according to claim 1, wherein the tubular body includes a radially outwardly extending ridge configured for receipt of the bulbous portion.

3. The connection joint according to claim 2, wherein the tubular body includes a radially expanded section that is configured for receipt of the tubular sleeve.

4. The connection joint according to claim 1, wherein the radially inwardly extending ribs extend axially along an entire length of the membrane seal body from the first terminal end to the opposite second terminal end.

5. The connection joint according to claim 4, wherein the radially inwardly extending ribs include a flat surface configured for contacting the exterior surface of the conduit.

6. The connection joint according to claim 4, wherein the radially inwardly extending ribs are configured to reduce friction between the conduit and the membrane seal body insertion of the conduit into the tubular body, and are configured to center the conduit relative to the tubular body during insertion of the conduit into the tubular body.

7. The connection joint according to claim 1, wherein the tubular body is configured to be crimped on axially opposing sides of the membrane seal body to fixedly engage the tubular body to the conduit.

8. The connection joint according to claim 1, wherein the primary seal feature and the secondary seal feature are unitary.

9. A connection joint for coupling a pair of conduits, comprising:
    a fitting comprising a tubular body having an inlet end and an outlet end, the inlet end and the outlet end each being configured for receipt of a respective conduit therein; and
    a first membrane seal body located within the tubular body and spaced apart from the inlet end and a second membrane seal body located within the tubular body and spaced apart from the outlet end, the first and second membrane seal bodies each having a first terminal end and an opposite second terminal end, the first terminal end defined by a bulbous portion located proximate the inlet end and outlet end, respectively, and the opposite second terminal end of each of the first and second membrane seal bodies being defined by a tubular sleeve unitary with the bulbous portion located away from the inlet end and outlet end respectively, and each of the first and second membrane seal bodies having a plurality of radially inwardly extending ribs that extend axially along each of the bulbous portion and the tubular sleeve, the radially inwardly extending ribs extending axially along an entire length of the tubular sleeve to the second terminal end of the first and second membrane seal bodies, respectively,
    wherein the membrane seals are each configured to sealingly engage an exterior surface of the conduits.

10. The connection joint according to claim 9, wherein the tubular body includes a pair of radially outwardly extending ridges that are each configured for receipt of a respective bulbous portion.

11. The connection joint according to claim 10, wherein the tubular body includes a pair of radially expanded sections that are each configured for receipt of a respective tubular sleeve.

12. The connection joint according to claim 9, wherein the radially inwardly extending ribs extend axially along a collective length of the first and second membrane seal bodies, respectively, from the first terminal end to the opposite second terminal end.

13. The connection joint according to claim 12, wherein the radially inwardly extending ribs include a flat surface configured for contacting the exterior surface of the conduits.

14. The connection joint according to claim 12, wherein the radially inwardly extending ribs are configured to reduce friction between the conduits and the first and second membrane seal bodies, respectively, during insertion of the conduits into the tubular body, and are configured to center the conduits relative to the tubular body during insertion of the conduits into the tubular body.

15. The connection joint according to claim 9, wherein the tubular body is configured to be crimped on axially opposing sides of the first and second membrane seal bodies, respectively, to fixedly engage the tubular body to the conduits.

* * * * *